(12) United States Patent
Cho

(10) Patent No.: US 10,184,527 B2
(45) Date of Patent: Jan. 22, 2019

(54) STRUCTURE OF CLUTCH FOR VEHICLE

(71) Applicant: Hyundai Motor Company, Seoul (KR)

(72) Inventor: Woon Ki Cho, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 284 days.

(21) Appl. No.: 15/137,490

(22) Filed: Apr. 25, 2016

(65) Prior Publication Data

US 2017/0122382 A1   May 4, 2017

(30) Foreign Application Priority Data

Nov. 4, 2015   (KR) .......................... 10-2015-0154533

(51) Int. Cl.
*F16D 13/38*  (2006.01)
*F16D 13/72*  (2006.01)

(52) U.S. Cl.
CPC .............. *F16D 13/72* (2013.01); *F16D 13/38* (2013.01); *F16D 2300/0212* (2013.01)

(58) Field of Classification Search
CPC .......... F16D 13/72–13/74; F16D 13/38; F16H 57/0415
See application file for complete search history.

(56) References Cited

U.S. PATENT DOCUMENTS

| 6,102,013 | A | * | 8/2000 | Lee | .......................... | F02B 33/40 |
| | | | | | | 123/559.1 |
| 6,219,191 | B1 | | 4/2001 | Iwaki et al. | | |

FOREIGN PATENT DOCUMENTS

| EP | 1152162 A2 | 11/2001 |
|---|---|---|
| JP | H07-004938 U | 1/1995 |
| JP | 2006-010033 | 1/2006 |
| JP | 2006-052756 | 2/2006 |
| JP | 2012-178982 | 9/2012 |
| KR | 10-2003-0016598 | 3/2003 |
| KR | 10-1072136 | 10/2011 |

OTHER PUBLICATIONS

Kim Sand Du, System for Cooling Clutch of Vehicle, Mar. 3, 2003, raw translation, 11 pages (Year: 2003).*

* cited by examiner

*Primary Examiner* — Jacob S. Scott
*Assistant Examiner* — Lillian T Nguyen
(74) *Attorney, Agent, or Firm* — Brinks Gilson & Lione

(57) ABSTRACT

A structure of a clutch for a vehicle includes: a blower which is provided in a clutch housing and rotates along with a flywheel, and the blower being provided with a turbine blade provided on an outer circumferential surface of the blower; a clutch unit which is provided in the clutch housing, and includes a clutch disc and a pressure plate; and an air duct including an inlet port formed in a portion of the clutch housing that faces the outer circumferential surface of the blower, the inlet port communicating with an interior of the clutch housing, and an outlet port disposed adjacent to an air intake port formed in a portion of the clutch housing that faces the clutch unit, so that air blown from the blower can be discharged to the clutch unit.

5 Claims, 3 Drawing Sheets

STRUCTURE OF CLUTCH FOR VEHICLE

CROSS REFERENCE TO RELATED APPLICATION

The present application claims priority to and the benefit of Korean Patent Application No. 10-2015-0154533, filed on Nov. 4, 2015, which is incorporated herein by reference in its entirety.

FIELD

The present disclosure relates to a structure capable of enhancing the performance of cooling a clutch so as to inhibit overheating of the clutch.

BACKGROUND

The statements in this section merely provide background information related to the present disclosure and may not constitute prior art.

Generally, vehicles are provided with a clutch which selectively transmits power from a crank shaft, which is a drive shaft of an engine, to a transmission which variously changes an engaged gear on an axle depending on a driving speed or the like of the vehicle.

When a gear shift is required depending on a driving speed of the vehicle while power is transmitted to the input shaft of the transmission, connection of the clutch with the crank shaft is temporarily interrupted to allow the engaged gear of the transmission to be changed to another gear, and then the clutch is re-connected with the crank shaft to enable transmission of power to the input shaft of the transmission after the gear shift has been completed.

In the clutch, when a clutch disc coupled with the input shaft of the transmission to transmit power to the input shaft of the transmission is coupled with a friction member provided on the drive shaft of the engine, the clutch disc and the friction member may be overheated by friction therebetween.

SUMMARY

The present disclosure is intended to propose a structure of a clutch for a vehicle which can simply and easily enhance the performance of cooling the clutch.

According to one aspect, there is provided a structure of a clutch for a vehicle, including: a blower provided in a clutch housing and configured to rotate along with a flywheel, the blower being provided with a turbine blade on an outer circumferential surface thereof; a clutch unit provided in the clutch housing, and including a clutch disc and a pressure plate; and an air duct including an inlet port formed in a portion of the clutch housing that faces the outer circumferential surface of the blower, the inlet port communicating with an interior of the clutch housing, and an outlet port disposed adjacent to an air intake port formed in a portion of the clutch housing that faces the clutch unit, the air duct being configured such that air blown from the blower is discharged to the clutch unit.

The air intake port of the clutch housing may be formed such that a cross-sectional area thereof is greater than a cross-sectional area of the outlet port of the air duct, and the outlet port of the air duct is provided to face the air intake port, whereby air outside the clutch housing flows toward the air intake port due to an effect of air blown from the air duct.

The air duct may be configured such that the outlet port is disposed inside the clutch housing through the intake port of the clutch housing.

A portion of the air duct that is adjacent to the outlet port may be provided in a nozzle shape.

The air duct may be provided such that a curved shape formed by the portion of the air duct that is adjacent to the outlet port corresponds to a shape of an upper edge of an air foil.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
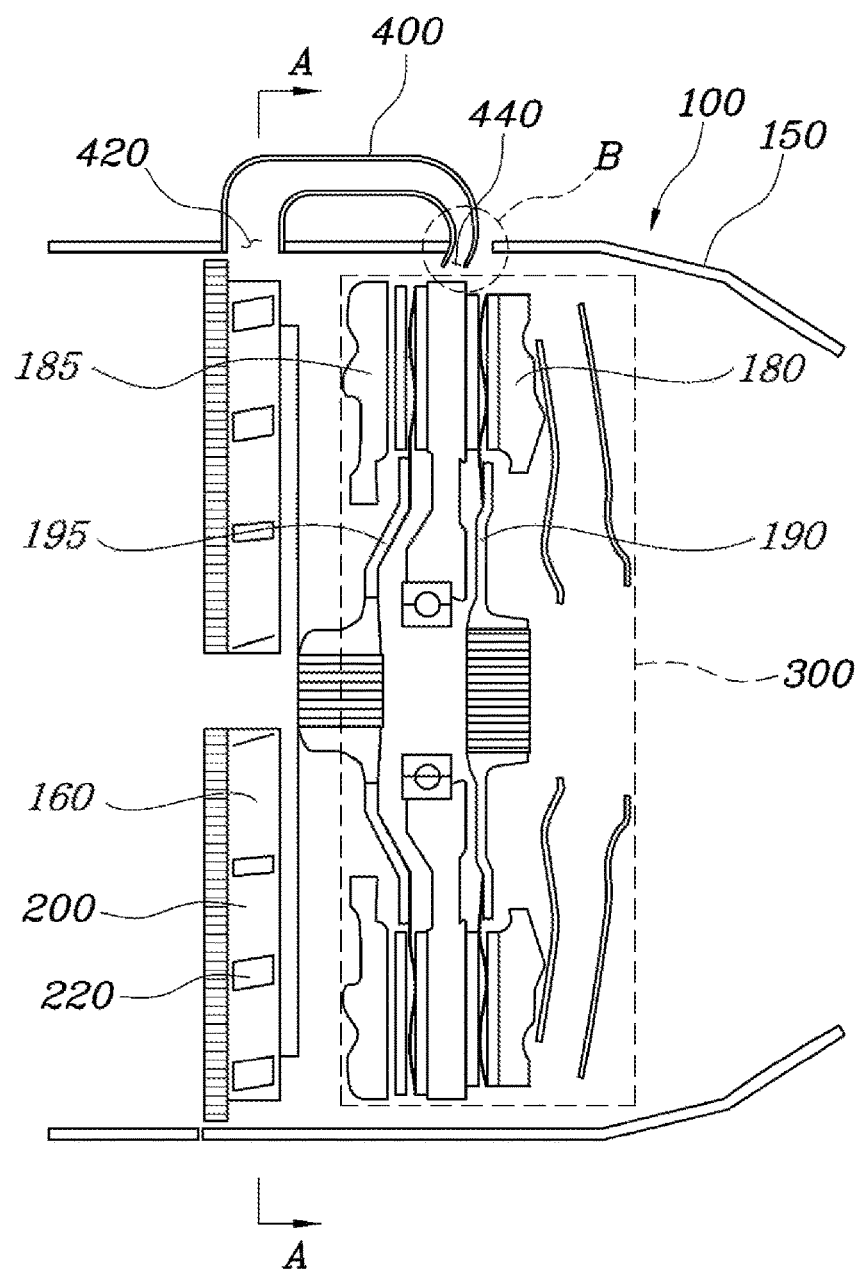
FIG. 1 is a view illustrating a structure of a clutch for vehicles according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
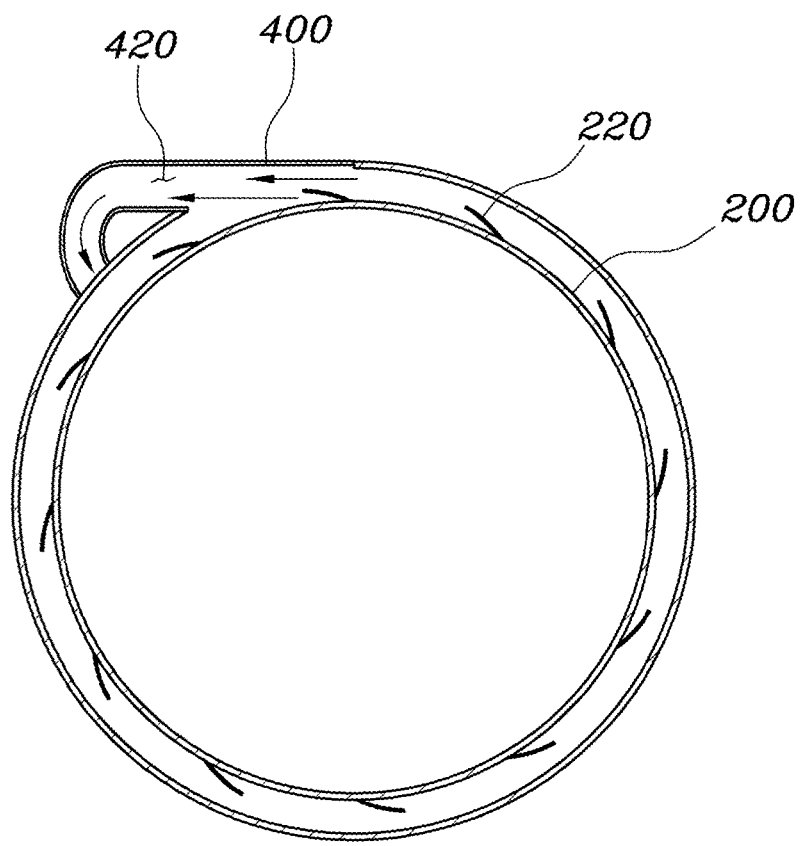
FIG. 2 is a sectional view showing the clutch structure taken along line A-A of FIG. 1.

As shown in FIGS. 1 and 2, a clutch structure 100 for a vehicle according to one form of the present disclosure includes: a blower 200 which is provided in a clutch housing 150, is configured to rotate along with a flywheel 160, and is provided with a turbine blade 220 on an outer circumferential surface thereof; a clutch unit 300 which is provided in the clutch housing 150 and includes a clutch disc 190, 195 and a pressure plate 180, 185; and an air duct 400 which includes an inlet port 420 that is formed in a portion of the clutch housing 150 facing the outer circumferential surface of the blower 200 and communicates with an interior of the clutch housing 150, and an outlet port 440 which is disposed adjacent to an air intake port 170 formed in a portion of the clutch housing 150 that faces the clutch unit 300, so that air blown from the blower 200 is discharged to the clutch unit 300 by the air duct 400.

In detail, the blower 200 is provided in the clutch housing 150 and configured to rotate along with the flywheel 160. The turbine blade 220 is formed on the outer circumferential surface of the blower 200. In one form, a base unit such as a circular disc or a ring member is provided, and the turbine blade 220 is formed on the outer circumferential surface of the base unit.

However, the blower 200 may be provided with various types of blades, for example, a propeller-type blade, in lieu of the turbine-type blade, and the configuration shape and method of the blower 200 may be changed in various ways. FIGS. 1 and 2 illustrate a shape in which a plurality of turbine blades 220 are formed on the outer circumferential surface of the circular disc provided adjacent to the flywheel 160.

Furthermore, the blower 200 is provided in the clutch housing 150. The base unit, which may be a form of the circular disc, the ring member or the like, is provided to have a structure capable of rotating along with a drive shaft of an engine in such a way that the base unit is spline-coupled to the drive shaft of the engine, or coupled to the flywheel 160, etc. Therefore, the blower 200 is able to form a circumferential compressed or accelerated air flow without a separate drive source for driving the blower 200.

In this way, compressed or accelerated air is blown to the clutch unit 300 by the blower 200 so that a flow speed of air drawn into the clutch unit 300 can be increased. Thereby, an air circulation rate of the clutch unit 300 can be enhanced, and the performance of cooling the clutch unit 300 can be improved.

The clutch unit 300 is provided in the clutch housing 150 and provided with the clutch disc 190, 195 and the pressure plate 180, 185. The clutch unit 300 is provided to be coupled with an input shaft of a transmission, and is selectively coupled with the drive shaft of the engine so as to function as a medium for transmitting power from the engine to the input shaft of the transmission.

The clutch unit 300 is configured in such a way that the clutch disc 190, 195 is compressed by a plate spring and the pressure plate 180, 185 and thus selectively coupled with a friction member provided on the drive shaft of the engine. FIG. 1 illustrates the configuration in which a plurality of clutch discs 190, 195 to be selectively coupled with the friction member of the drive shaft of the engine are provided, and the plate spring and the pressure plate 180, 185 for compressing the clutch disc 190, 195 are provided.

In the friction type clutch unit 300, during a process in which the clutch disc 190, 195 is compressed and coupled with the friction member provided on the drive shaft of the engine, the clutch unit 300 may be overheated by frictional heat which is generated due to a difference in rotating speed between the friction member and the clutch disc provided on the drive shaft of the engine. This is a major factor of overheating in the clutch, particularly, the friction type clutch, for vehicles.

We have discovered that to inhibit or prevent problems such as damage or deformation of the clutch due to overheating, various methods for cooling the clutch are needed. Particularly, in the case of an air-cooling type clutch, the more an air circulation rate between the interior and the exterior of the clutch is increased, the more the cooling performance is enhanced.

The inlet port 420 of the air duct 400 is formed in a portion of the clutch housing 150 that faces the outer circumferential surface of the blower 200. The inlet port 420 communicates with the interior of the clutch housing 150. The outlet port 440 of the air duct 400 is disposed adjacent to an air intake port 170 formed in a portion of the clutch housing 150 that faces the clutch unit 300. Thus, air blown from the blower 200 can be discharged to the clutch unit 300 by the air duct 400. FIGS. 1 and 2 illustrate the shape of the air duct 400 provided in the clutch structure 100 for vehicles in accordance with one form of the present disclosure.

The air duct 400 is disposed outside the clutch housing 150 and may have various cross-sectional shapes, e.g., a circular or polygonal cross-sectional shape. Air flow formed by the blower 200 passes through the air duct 400 from the inlet port 420 of the air duct 400.

The outlet port 440 of the air duct 400 is disposed adjacent to the air intake port 170 which is formed, for the purpose of air circulation of the clutch unit 300, in a portion of the clutch housing 150 that faces the clutch unit 300. Thus, air flow formed by the blower 200 is discharged into the air intake port 170 of the clutch housing 150 through the air duct 400. Thereby, a rate at which air is drawn into the clutch unit 300 is increased and, simultaneously, a rate at which air is discharged from the clutch unit 300 is also increased. Therefore, an air change rate in the clutch unit 300 is increased, whereby the performance of cooling the clutch can be enhanced.

Moreover, the flow of air discharged into the air intake port 170 of the clutch housing 150 through the air duct 400 is accelerated by the blower 200, whereby a heat exchange rate with the clutch unit 300 is increased, and this is thus advantageous for enhancing the performance of cooling the clutch.

Furthermore, in one form, a longitudinal direction in which the inlet port 420 of the air duct 400 extends corresponds to a circumferential direction of the blower 200 that faces the inlet port 420 of the air duct 400. That is, the inlet port 420 of the air duct 400 extends in a direction parallel to the flow direction of air formed by the blower 200. Thereby, refraction of an air flow path formed by the blower 200 can be reduced while air is drawn into the air duct 400.

Therefore, a flow rate loss of the air flow formed by the blower 200 can be reduced. FIG. 2 illustrates the inlet port 420 of the air duct 400 having the above-mentioned shape in accordance with the form of the present disclosure.

Figure 3:
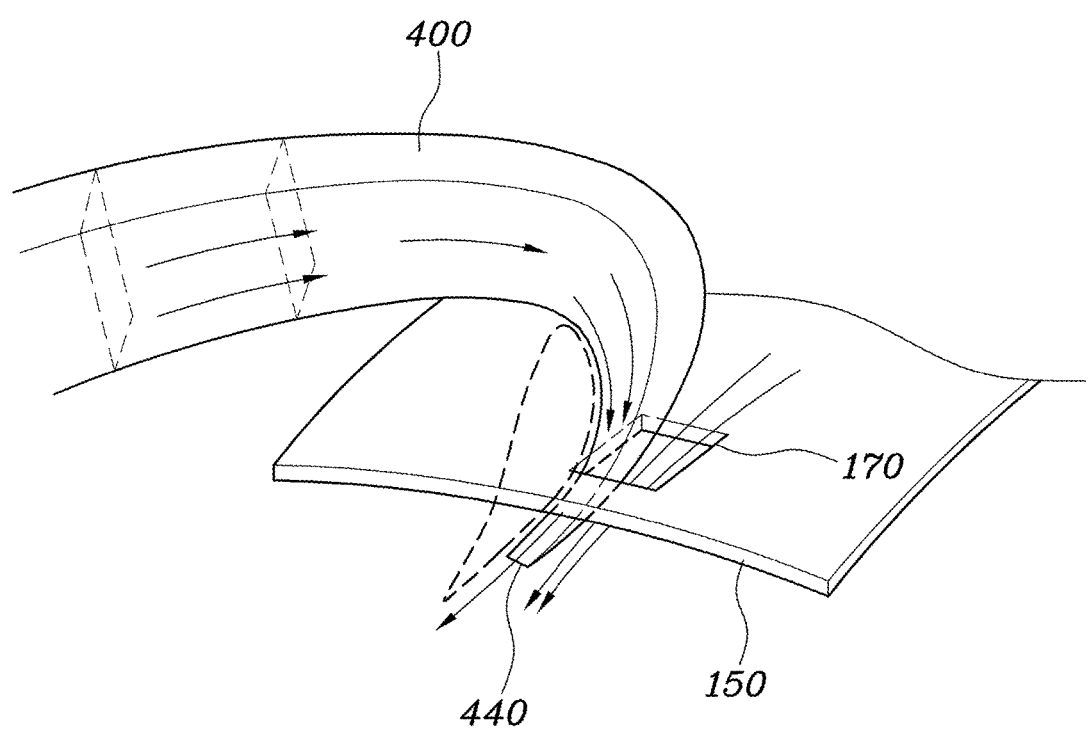
FIG. 3 is an enlarged view of portion B of the clutch structure shown in FIG. 1.

As shown in FIG. 1 or 3, in the clutch structure 100 for vehicles, the air intake port 170 of the clutch housing 150 is formed such that the cross-sectional area thereof is greater than that of the outlet port 440 of the air duct 400. The outlet port 400 of the air duct 400 is provided to face the air intake port 170. Therefore, due to effect of air blown from the air duct 400, air outside the clutch housing 150 is drawn into the air intake port 170.

The air intake port 170 may have various shapes, e.g., a circular, elliptical or polygonal shape, and is formed such that the cross-sectional area thereof is greater than that of the outlet port 440 of the air duct 400 so as to enable not only air blown from the air duct 400 but also outside air around the air intake port 170 to flow into the air intake port 170. FIG. 1 shows the shapes and locations of the outlet port 440 of the air duct 400 and the air intake port 170. FIG. 3 illustrates in detail the shape of the air intake port 170 and the periphery thereof.

The flow of air, which flows toward the clutch unit 300 via the air intake port 170 after being discharged from the outlet port 440 of the air duct 400 that is disposed adjacent to the air intake port 170 of the clutch housing 150, can affect the flow of outside air around the air intake port 170 of the clutch housing 150 such that the outside air flows toward the air intake port 170.

That is, air that is increased in flow rate by the blower 200 is discharged from the air intake port 170 of the clutch housing 150 through the air duct 400. Because the air intake port 170 of the clutch housing 150 has a cross-sectional area greater than that of the outlet port 440 of the air duct 400, not only air blown from the blower 200 but also outside air around the air intake port 170 can flow toward the clutch unit 300 through the air intake port 170.

Meanwhile, as shown in to the form of the present disclosure, the air duct 400 is configured such that the outlet port 440 is disposed inside the clutch housing 150 through the air intake port 170 of the clutch housing 150.

Thereby, flow rate and speed losses of air which flows from the air duct 400 toward the clutch unit 300 can be reduced, and the flow of air from the air intake port 170 toward the clutch unit 300 can be reliably formed. Hence, the structure of the present form is advantageous for increasing an air circulation rate of the clutch unit 300 and forming the flow of outside air toward the air intake port 170.

As shown in FIG. 1 or 3, in the clutch structure 100 for vehicles, a portion of the air duct 400 that is adjacent to the outlet port 440 is provided in a nozzle shape.

In the present form, the portion of the air duct 400 that is adjacent to the outlet port 440 close to the air intake port 170 of the clutch housing 150 is provided in a nozzle shape reducing in cross-sectional area toward the air intake port 170. FIG. 1 or 3 illustrates variation in cross-sectional area of the portion of the air duct 400 that is adjacent to the outlet port 440.

In the case where a flow path of fluid is provided in a nozzle shape, as the cross-sectional area of the air duct 400 is reduced along the longitudinal direction, the flow speed is increased. Thereby, the flow of air toward the central portion of the clutch unit 300 is reinforced and thus is advantageous for air circulation in the clutch housing 150. In addition, the reinforce air flow increases the effect on the outside air of the clutch housing 150, thus increasing a flow speed at which air is drawn into the clutch unit 300.

As shown in FIG. 1 or 3, in the clutch structure 100 for vehicles, the air duct 400 is configured such that a curved shape formed by the portion of the air duct 400 that is adjacent to the outlet port 440 corresponds to the shape of an upper edge of an airfoil.

With regard to the flow of fluid, the shape of the upper edge of the airfoil, which is generally streamlined, makes smooth fluid flow with reduced resistance possible.

Given this, the extended shape of the portion of the air duct 400 that is adjacent to the outlet port 440 corresponds to the shape of the upper edge of the airfoil, whereby the flow of air can be smoothened while passing through the air duct 400 and being curved toward the air intake port 170.

FIG. 1 or 3 illustrates the case where the curved shape of the portion of the air duct 400 that is adjacent to the outlet port 440 corresponds to the shape of the upper edge of the airfoil.

As described above, a structure of a clutch for a vehicle according to one form of the present disclosure may do simply and easily the performance of cooling the clutch.

Particularly, air is blown toward a clutch disc by a blower that rotates along with a flywheel in a clutch housing so that the air-cooling performance for the clutch disc can be enhanced.

Furthermore, air increased in flow speed by the blower flows to a clutch unit of the clutch housing through an air duct. Accordingly, the clutch cooling performance can be markedly enhanced by air flow formed by the blower.

In addition, an outlet port of the air duct is provided in a nozzle shape reducing in cross-sectional area toward the end of the air duct, so that a flow speed of air discharged from the air duct can be increased, whereby the performance of cooling the clutch can be further enhanced.

Although the exemplary form of the present disclosure has been described for illustrative purposes, those skilled in the art will appreciate that various modifications, additions and substitutions are possible, without departing from the scope and spirit of the present disclosure.

What is claimed is:

1. A structure of a clutch for a vehicle, comprising:
a blower provided in a clutch housing and configured to rotate along with a flywheel, the blower being provided with a turbine blade on an outer circumferential surface thereof;
a clutch unit provided in the clutch housing, and including a clutch disc and a pressure plate; and
an air duct including an inlet port formed in a portion of the clutch housing that faces the outer circumferential surface of the blower, the inlet port configured to communicate with an interior of the clutch housing, and an outlet port disposed adjacent to an air intake port formed in a portion of the clutch housing that faces the clutch unit, the air duct being configured such that air blown from the blower is discharged to the clutch unit.

2. The structure according to claim 1, wherein the air intake port of the clutch housing is formed such that a cross-sectional area thereof is greater than a cross-sectional area of the outlet port of the air duct, and the outlet port of the air duct is provided to face the air intake port, whereby air outside the clutch housing flows toward the air intake port due to an effect of air blown from the air duct.

3. The structure according to claim 1, wherein the air duct is configured such that the outlet port is disposed inside the clutch housing through the intake port of the clutch housing.

4. The structure according to claim 1, wherein a portion of the air duct that is adjacent to the outlet port is provided in a nozzle shape.

5. The structure according to claim 1, wherein the air duct is provided such that a curved shape formed by the portion of the air duct that is adjacent to the outlet port corresponds to a shape of an upper edge of an air foil.

* * * * *